(12) United States Patent
Kik, Sr. et al.

(10) Patent No.: US 8,474,068 B2
(45) Date of Patent: Jul. 2, 2013

(54) TRENCH SHOWER DRAIN

(75) Inventors: Paul S. Kik, Sr., Hudsonville, MI (US); Paul S. Kik, Jr., Grand Rapids, MI (US)

(73) Assignee: Noble Company, Spring Lake, MI (US)

( * ) Notice: Subject to any disclaimer, the term of this patent is extended or adjusted under 35 U.S.C. 154(b) by 743 days.

(21) Appl. No.: 12/652,261

(22) Filed: Jan. 5, 2010

(65) Prior Publication Data

US 2011/0162137 A1    Jul. 7, 2011

(51) Int. Cl.
A47K 3/00    (2006.01)

(52) U.S. Cl.
USPC .................................................. 4/613; 4/679

(58) Field of Classification Search
USPC ....................................................... 4/613, 679
See application file for complete search history.

(56) References Cited

U.S. PATENT DOCUMENTS

| | | | |
|---|---|---|---|
| 358,651 A * | 3/1887 | Clifford | 4/310 |
| 1,017,167 A | 2/1912 | Pleins | |
| 2,106,516 A | 8/1936 | Cheney | |
| 3,363,267 A | 1/1968 | Kaiser et al. | |
| 3,551,918 A | 5/1969 | Bergmark | |
| 3,457,568 A | 7/1969 | Amatruda | |
| 4,541,132 A | 9/1985 | Long | |
| 4,557,004 A | 12/1985 | Piana | |
| 5,230,188 A | 7/1993 | Nurse | |
| 5,718,008 A | 2/1998 | Pane | |
| 5,911,518 A | 6/1999 | Jurek et al. | |
| 6,003,169 A | 12/1999 | Davis, Jr. | |
| 6,014,780 A | 1/2000 | Jurek et al. | |
| 6,088,984 A | 7/2000 | Kirby | |
| 6,141,803 A | 11/2000 | Dunphy et al. | |
| 6,170,095 B1 | 1/2001 | Zars | |
| 6,178,571 B1 | 1/2001 | McAllister | |
| 6,240,578 B1 | 6/2001 | Planella | |
| 6,381,773 B1 | 5/2002 | McAllister | |
| 6,571,406 B2 | 6/2003 | Gerloff | |
| 6,612,780 B2 | 9/2003 | Dahowski et al. | |
| 6,725,470 B2 | 4/2004 | Webb | |
| 6,755,966 B1 | 6/2004 | Reed | |

(Continued)

FOREIGN PATENT DOCUMENTS

| | | |
|---|---|---|
| EP | 0578445 A1 | 12/1994 |
| GB | 2270836 A | 3/1994 |

(Continued)

OTHER PUBLICATIONS

Exhibit 1 is a brochure entitled "Advantages of a Linear Drain" illustrating prior art structure manufactured by Quick Drain USA company (2 pages).

(Continued)

*Primary Examiner* — Huyen Le
(74) *Attorney, Agent, or Firm* — Price Heneveld LLP

(57) ABSTRACT

A shower trench drain apparatus includes a shower trench drain body of polymeric material having an integrally-formed drain channel with angled bottom surface and drain opening or openings, a waterproof membrane over the drain body, a clamp ring retaining the membrane to the drain body, and a grate adjustably retained to the drain body by a height adjustment mechanism. The trench drain body formed from a block of material such as PVC or ABS, which are compatible with approved plumbing materials and codes. The block has a flat bottom adapted for horizontal support during installation and includes integrally-formed features facilitating adjustment during installation while minimizing components and separate parts and simplicity of installation.

17 Claims, 4 Drawing Sheets

U.S. PATENT DOCUMENTS

| | | | |
|---|---|---|---|
| 6,792,723 B2 | 9/2004 | Stegmeier, Sr. et al. | |
| 7,246,472 B2 | 7/2007 | Nielsen | |
| D582,527 S | 12/2008 | Wang | |
| 7,507,054 B2 | 3/2009 | Fithian et al. | |
| 2003/0033668 A1 | 2/2003 | Pane | |
| 2005/0081290 A1 | 4/2005 | Stimpson | |
| 2005/0223485 A1 | 10/2005 | Nijhof | |
| 2010/0162481 A1* | 7/2010 | Erlebach | 4/613 |
| 2011/0088161 A1* | 4/2011 | Stimpson | 4/613 |

FOREIGN PATENT DOCUMENTS

| | | |
|---|---|---|
| GB | 2282156 A | 3/1995 |
| WO | 2007004863 A1 | 1/2007 |
| WO | 2007086734 A1 | 8/2007 |

OTHER PUBLICATIONS

Exhibit 2 is a brochure entitled "The ABC's of Trench Drainage" illustrating prior art structure manufactured by ACO Polymer Products, Chardon, Ohio (2 pages).

Exhibit 3 is a brochure entitled "Shower Channels" illustrating prior art structure manufactured by ACO Polymer Products, Chardon, Ohio (8 pages).

Exhibit 4 is a brochure entitled "Purus Line Floor Drains" illustrating prior art structure manufactured by Purus Group, (2 pages).

Exhibit 5 is a publication entitled "Installation Instructions for Purus Line" illustrating prior art structure manufactured by Purus Group (24 pages).

\* cited by examiner

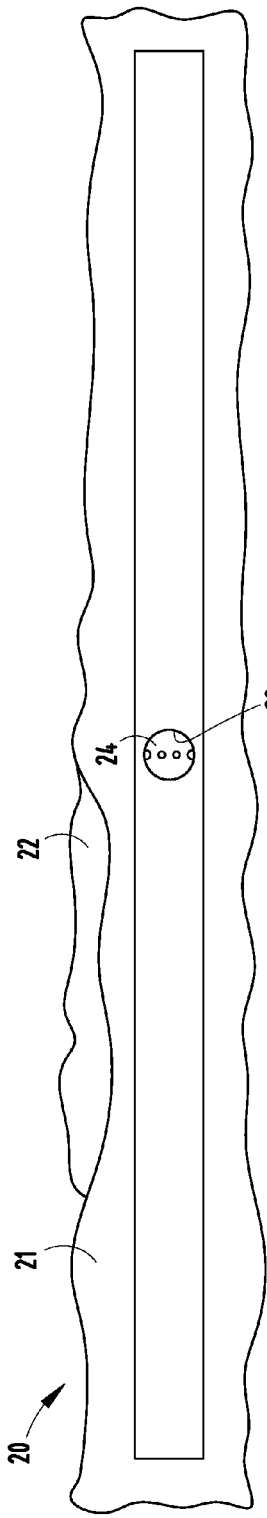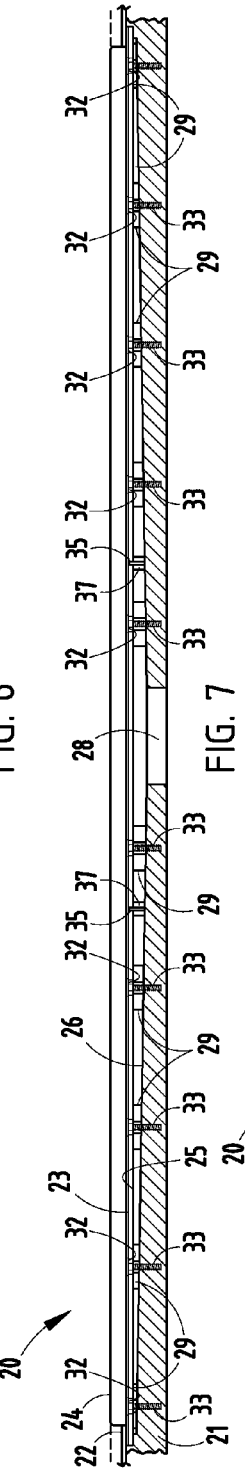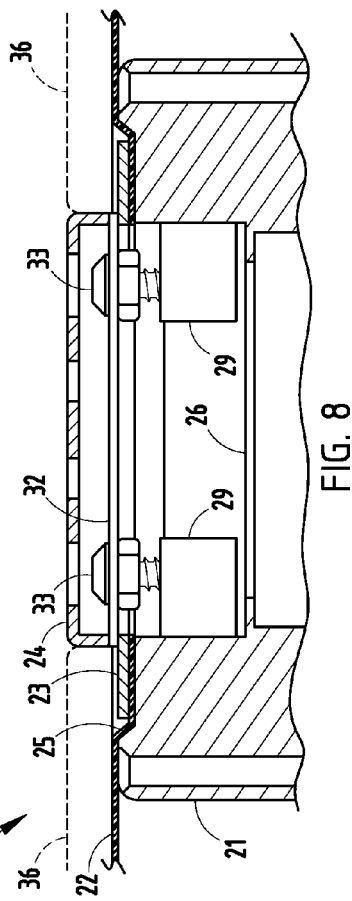

TRENCH SHOWER DRAIN

BACKGROUND

The present invention relates to shower drains, such as are often used in residential, commercial, and institutional shower constructions.

Typical tiled showers must by code and design have a slope that moves the water from all floor surfaces to the drain. A normal shower configuration would be a square, rectangle, or a polygon. Those configurations mandate four or more triangular shaped quadrants all converging at the drain. Modern day designs have mandated larger overall size showers and more complex base configurations. The larger the shower foot print, the longer the slope. However, these configurations cause problems as noted below.

Each sector of these polygons creates an intersecting plane that creates problems for the setting of tile on the base. Even with small tile or stone (2"×2"), these changes in plane make the finished floor show these changes in plane, which can be aesthetically unacceptable and further can lead to leak problems at lines of intersection. For example, historically the drain is most often placed at the common vertex of these polygons. With the design world trending to larger format tile, the setting of tile with intersecting planes creates a virtually impossible situation for the tile setter due the changes in plane. In addition, many designs go to single slabs of stone for the shower base. This creates a problem for the installation since all drains are designed to be parallel to the subfloor.

A trench drain at the outboard side of one of the peripheral sides of the configuration can solve this problem. It is still necessary to provide the appropriate slope as listed in the plumbing code. However, since the intersecting planes have been eliminated, the size tile used as a finished surface is now not a factor. This opens up the options in both the design and materials that can be used.

Trench drains have been used in outdoor applications by the construction industry for many years. The most common usage is slab on grade applications, such as at the edge of parking lots and building entrances. These applications do not require 100% leak integrity since the ground fill surrounding the drain absorbs any leakage that occurs. These type trench drains are typically manufactured in a variety of linear processes in plastic and various metals. The drain is cut and assembled in sections with end caps at the ends of a run.

While the concept for shower trench drains is similar, the requirement that the installation be 100% waterproof is mandated by code. Since the vast majority of applications are over occupied space, the watertight integrity of the drain system is critical and flood testing is required by most plumbing codes.

There are some existing trench drains for buildings. Most are constructed of variety of grades of stainless steel, and include drain bodies constructed from combinations of cut segments welded together or stampings with additionally welded components. Due to the large number of sizes required by the design community, the ability to build multiple size dies for the drain bodies is not cost effective. Thus, components in known existing trench drain configurations are typically welded. However, welding is expensive and can lead to leak problems. For example, many times welding is the cause for small undetectable leaks that lead to water problems in the field that will not be noticed for many years, at a time when they have already created considerable problems such as rotted under-floor structures and smells associated with wet moldy environments. Notably, leaks can occur at the welds either at the time of manufacture, or during or after installation. These leaks can increase over time (or show up for a first time), due to corrosion and/or stress during installation and/or fatigue and/or from material stress caused in part by the welding. Quality control of welding is difficult, time consuming, and can add considerably to manufacturing expense, particularly where the welding extends 360 degrees around a pipe or connection. It is noted that shower trench drains are unforgiving, in that the water being drained away will find all leaks, and will eventually cause a problem.

Additionally, most known shower trench drains have trench bodies that are made of sheet metal formed with multi-angled surfaces, making them difficult to accurately position during an installation. Specifically, every trench body must have a specific slope for adequate water drainage. The mandated slope in the trench body (with constant wall thickness) leaves a bottom of the drain body on an angle to the drain opening. This occurs since the sheet material of known trench bodies has a uniform constant wall thickness. This factor leads to difficult installations since the drain body needs to be supported by dry packed mortar (or adjustable jacks that are left in the mortar bed) at a perfect sloped angle. It is not easy to form dry packed mortar at a perfect sloped angle, as required to support the known shower trench drain bodies. Molded trench drains also have a similar problem. Specifically, trench drains that are molded from thermoplastic materials effectively have the same issues since constant-thickness wall design is a typical requirement for injected molded designs.

Known existing trench drains are commonly constructed in straight length configurations from 24 to 72 inches. Whether the drain is made from metal or plastic material, the costs to tool the numerous sizes is often cost prohibitive. Complex configurations other than straight are generally too complex to fabricate in metal, except by welding as noted above, since their low volume manufacture makes it cost prohibitive to invest in expensive capital-intensive tooling.

SUMMARY OF THE PRESENT INVENTION

In one aspect of the present invention, a shower trench drain apparatus includes a water collecting trench drain body with a block of material compatible with approved plumbing materials and codes and that is formed to include a drain channel with angled bottom surface.

In another aspect of the present invention, a shower trench drain apparatus comprises a water collecting trench drain body including a block of material having a flat bottom adapted for horizontal installation and an integrally-formed up-facing drain channel with angled bottom surface.

In another aspect of the present invention, a shower trench drain apparatus includes a shower trench drain body of polymeric material having an integrally-formed drain channel with angled bottom surface and drain opening, a waterproof membrane over the drain body, a clamp ring retaining the membrane to the drain body, and a grate adjustably retained to the drain body by a height adjustment mechanism.

In another aspect of the present invention, a method of constructing a shower trench drain apparatus comprises steps of forming a shower trench drain body of polymeric material including a flat bottom surface, an integrally-formed drain channel with angled bottom surface and a drain opening. The method further includes steps of supporting the body on a flat support surface in an installation, laying a waterproof membrane over the drain body, clamping the membrane onto the body using a clamp ring, and attaching a grate adjustably to the drain body with an adjusted height that matches a final floor surface of a shower.

The present system has several advantages including: very waterproof (especially given a lack of welds on metal drain components), foolproof in terms of installation, cost effective given the few and simple components, mates well with existing shower drain systems. The trench body made by a formed plastic block is seen as a real advantage given the low volume of these parts, since it can be manufactured on a just-in-time basis (which minimizes inventory cost and tooling investment), such as by being machined with CNC equipment.

These and other aspects, objects, and features of the present invention will be understood and appreciated by those skilled in the art upon studying the following specification, claims, and appended drawings.

BRIEF DESCRIPTION OF DRAWINGS

FIGS. 2A, 3-6 are perspective, top, side, bottom, and end views of the assembled shower trench drain assembly of FIGS. 1-2.

FIGS. 7 and 8 are cross sections taken along lines VII-VII and VIII-VIII in FIGS. 3 and 4, respectively.

DETAILED DESCRIPTION OF PREFERRED EMBODIMENTS

Figure 1:
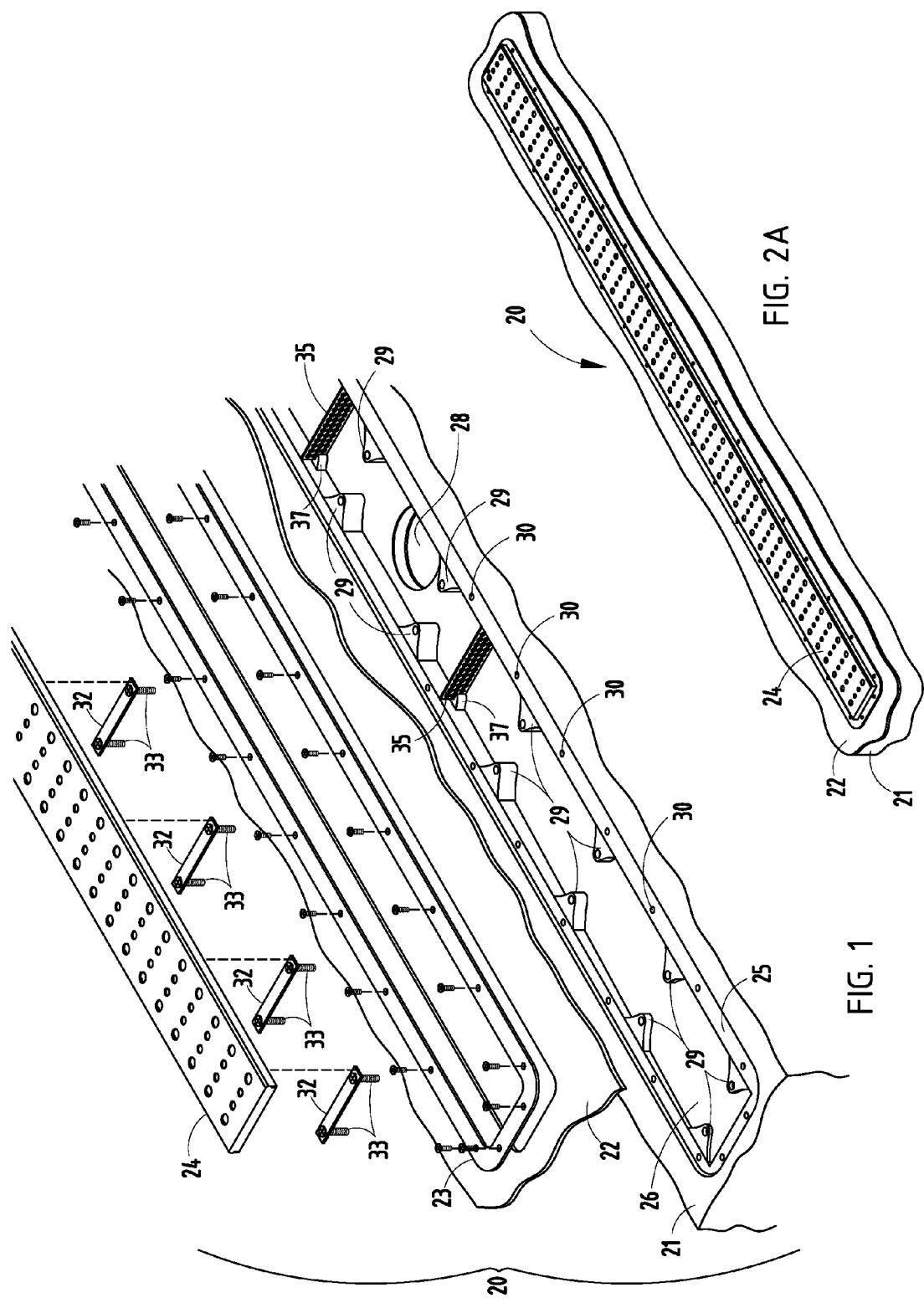
FIG. 1 is an exploded perspective view of the present shower trench drain apparatus.

The present shower trench drain apparatus includes a trench body constructed from a single block of material machined to its final shape including various integral features. It is contemplated that the material will typically be selected to be a polymer such as PVC (Poly Vinyl Chloride) or ABS (Acrylonitrile butadiene styrene). A reason is because these materials are capable of being machined in addition to being compatible with common types of rigid pipe used in the plumbing industry. Further, it is noted that PVC and ABS materials are widely available in large format sheets with many available thicknesses. This allows the construction of complex design shapes by CNC machining with the only limitation being the overall dimension of the raw block. The present inventive concepts are based in part on the premise that it is far more cost effective (for manufacturing, installation, and durability reasons) to design and manufacture configurations into a block of material than it is to cut, stamp and (reliably) weld an even walled metal material of constant thickness. Notably, the present trench body has a flat horizontal bottom surface, which greatly facilitates installation since preparation of the supporting material for the trench drain body (i.e., mortar or other material) only requires making it horizontally level/flat, as noted below.

Since the drain is formed from a single block of plastic, the configurations are only limited to creativity of the designer. This allows for the ability to create complex polygons with multiple drain slopes and drain openings. CAD (Computer Assisted Design) and CAM (Computer Assisted Manufacturing) make design and manufacturing very feasible. In addition, the PVC and ABS materials used in the drain construction are able to be directly solvent welded (or adhesively bonded) to common rough in drain pipes. This eliminates the need for special adapters to connect the drain body to the rough in drain pipe. This is potentially very important, since solvent welding (and adhesively bonding) can create very high quality and easily formed joints that are leak-proof and with high long-term reliability of the absence of leaks.

The present apparatus incorporates a flat bottom surface on the drain body itself. This allows for direct mechanical attachment to the subfloor without the need for leveling mechanisms or shims or jacks found in conventional metal trench drains. In addition this eliminates the need to cut away the subfloor in order to allow for the code mandated slope on the drain interior.

The present apparatus can be used in both mortar bed and thin-bed applications since the drain bottom is always flat. Since many thicknesses of tile and stone are available, this invention incorporates the feature of multiple standoffs to adjust the finish drain cover to the same plane as the top of the drain cover. This is critical to the final appearance of the shower floor and the function of the drain. It can adjustably accommodate the additional thickness for the material that is used to bond the tile to the shower floor substrate.

Additionally, the present apparatus can incorporate a pre-drain strainer that collects soap residue, hair and other matter that is not collected by the finish cover or grate. The pre-drain strainer can be constructed of plastic or metal and is located prior the drain opening. It incorporates a series of holes that allow for the water to pass through to the drain hole, but collect any foreign matter that makes it to that point. This feature allows for cleaning foreign matter from the drain by just removing the drain cover, and clearing or dumping the pre-drain strainer. This feature also reduces the frequency of need for using a plumbers snake to clean the system. It also reduces maintenance issues in both residential and large commercial applications.

Since watertight integrity is needed any all shower applications, the present apparatus incorporates a mechanism for sealing and mechanically locking the waterproof membrane to the drain body. The design includes a continuous channel of a semi-circular configuration formed on the top of the trench drain body adjacent to the perimeter of the water collection containment portion of the drain body. This channel is filled with an appropriate waterproof elastomeric sealant. NobleSealant 150 is an example of a proper sealant. A stainless steel clamping ring seal is fastened to the drain body by the means of small self tapping stainless steel screws. The section of material below the clamping ring is depressed to create a downward flow of drain water to the collection chamber of the drain body.

The waters exit point (i.e., drain outlet opening) is generally in the center of the collection chamber, but can be placed at any point in the collection chamber as long as the slope directs the water to the exit point. The illustrated drain body has an exit point constructed in a manner that allows the rough in drain pipe to be solvent welded to the drain body without the use of separate plastic fittings.

A drain cover (or grate) of typically stainless steel covers the water collection chamber. The drain cover is shaped in a c-channel configuration to improve its rigidity. It is both functional and decorative and can be constructed with openings and patterns forming unique/aesthetic designs and finishes. A number of integral standoff bosses are incorporated into the collection chamber of the body. Stainless steel screws adjustably engage these bosses allow the strainer cover to be brought level to the finish floor. After the cover is properly adjusted to the proper height, additional screws are used to mechanically fasten the cover to the drain body and fix its height.

Figure 2:
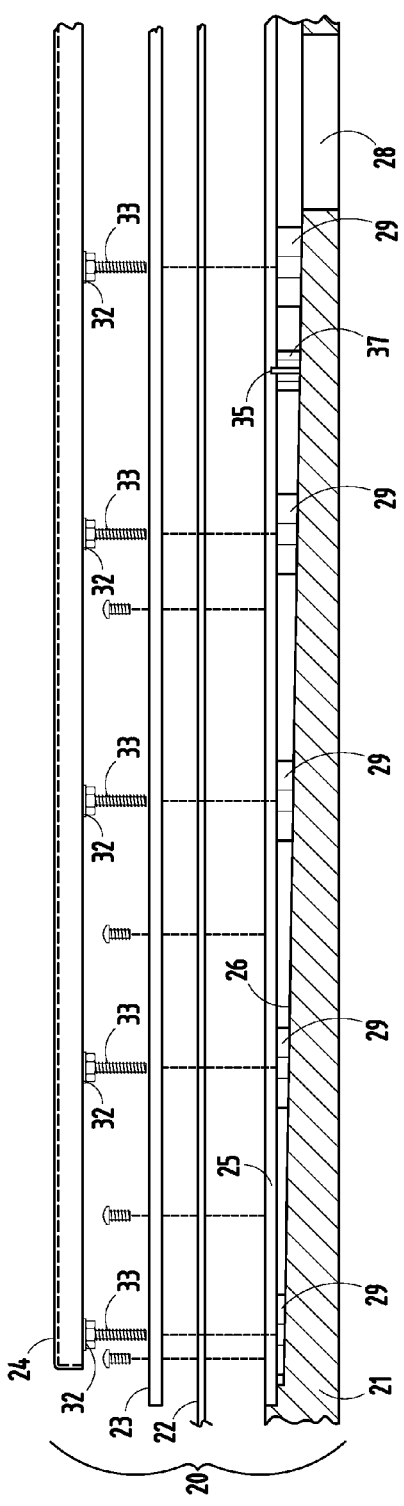
FIG. 2 is a side cross sectional view of an assembly of the components in FIG. 1.

In regard to the drawings, the illustrated shower trench drain assembly 20 (FIGS. 1-2) includes a shower trench drain body 21, a waterproof sheet liner 22, a clamp ring 23, and a cover or grate 24. The drain body 21 is placed at a side of the shower floor and embedded to be flush with a slightly-angled planar floor. The drain body 21 is a relatively-thick block of plastic material, such as 1-4" high, 4-6" wide if it is straight drain design, and several inches long, such as 6 to 96 inches, and is PVC or ABS or similar plastic. The slab is substantially free of stress so that the block does not warp when machined, nor warp over time after installation. (Stress free blocks of PVC and ABS are commercially available.) A clamp ring recess 25 is formed around and into a top of the block, and a drain channel 26 is also formed into the top. The clamp ring recess 25 is configured to receive a sealant material or a gasket to create a pliable permanent seal around the opening cut into the sheet liner 22 over the drain channel 26 in drain body 21, and cooperates with the mechanical clamp mechanism to further assure a leak-proof assembly and installation. The drain channel 26 includes an angled bottom surface that angles toward a center drain hole 28 and a plurality of screw-receiving bosses 29 are formed around edges of the drain channel 26. Pilot holes are drilled in the drain body to receive self tapping standoff screws. A sheet of water proof material liner 22 is placed on the drain body 21 and extends across the entire shower floor. The clamp ring 23 clamps the liner 22 onto the drain body 21. An inside area is cut away to expose the drain channel 26. The grate 24 includes welded-on components 32 with holes through which threaded screws 33 are extended and that extend downward to mechanically hold the cover in place. (It is noted that the welded-on components 32 are above the liner 22 and inside the channel of the body 21, such that they cannot cause a water leak problem.) The drain cover height adjustment screws 33 engage the holes 30. A top surface of the grate 24 lies flush to a shower floor once ceramic tiles 36 are installed on the shower floor.

Figure 3:
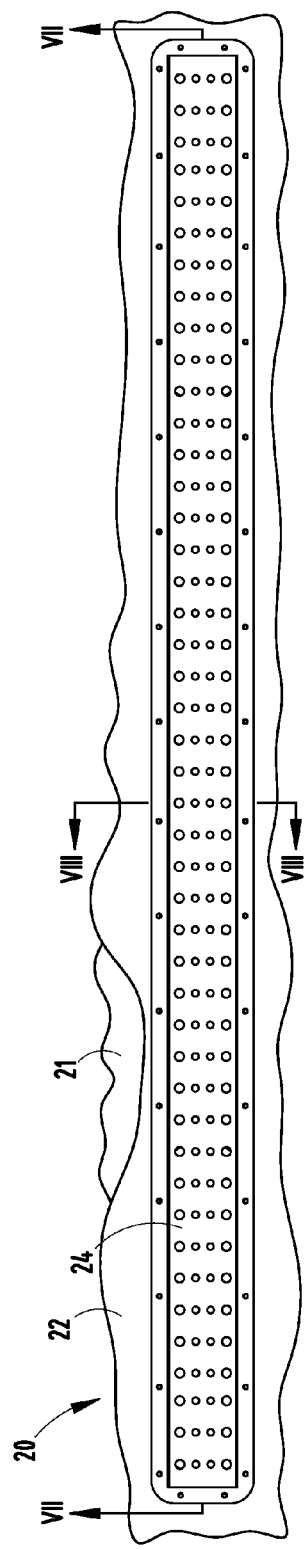
Figure 4:
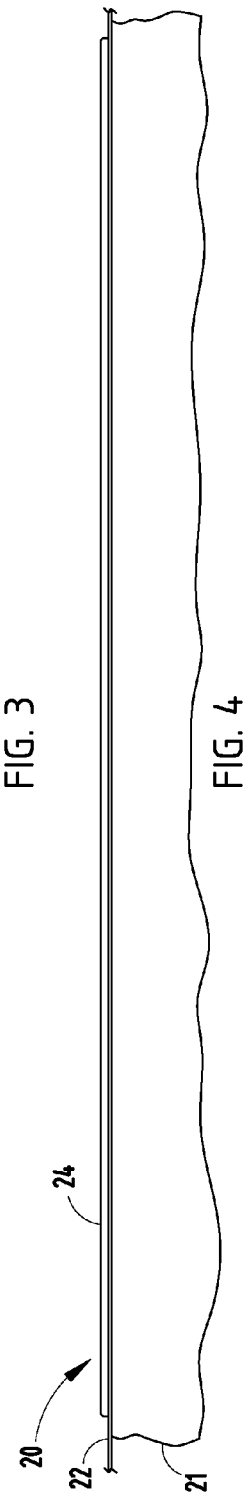

FIGS. 2A, 3-6 are perspective, top, side, bottom, and end views of the assembled shower trench drain assembly 20, and FIGS. 7 and 8 are cross sections taken along lines VII-VII and VIII-VIII in FIGS. 3 and 4.

Figure 9:
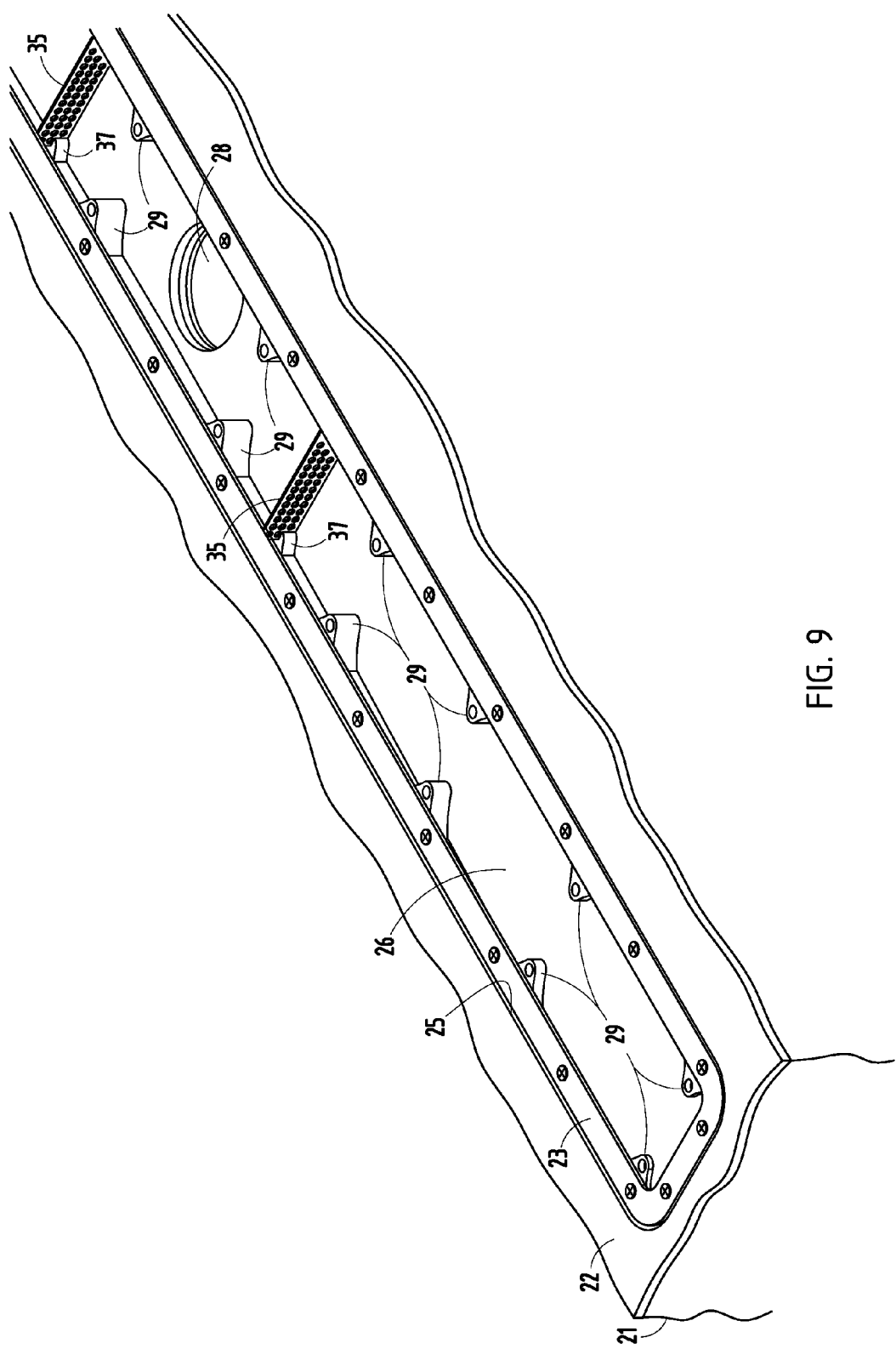
FIG. 9 is a perspective view of an end of a shower trench drain assembly.

FIG. 9 is a perspective view of an end of a shower trench drain assembly 20. Illustrated is a clamp ring 23 held in place with screws, and a grate 24 held to the bosses 29 with separate screws. The grate 24 is supported above the remainder of the assembly, so that its top surface is flush with the shower floor once ceramic tiles are installed.

It is contemplated that the present inventive apparatus can include additional features and accessories, such as a pre-drain strainer 35 that fits into slotted weir holder 37. The pre-drain strainer 35 (FIGS. 1-2) can be constructed of plastic or metal, and is located prior the drain opening. It incorporates a series of holes that allow for the water to pass through to the drain hole, but that allow the strainer to collect any foreign matter that makes it to that point. This feature allows for cleaning foreign matter from the drain by just removing the drain cover. This feature also reduces the frequency of need for using a plumbers snake to clean the system set into the channel 26. The strainer 35 can have a shape similar to the channel 26 and be similar in length (or shorter). It would be hidden under the cover or grate 24, but would be easily removable upon removing the cover. Alternatively, it is contemplated that arrangements could be made so that the strainer set into the cover and was removable without first removing the cover.

Notably, it is contemplated that a scope of the present invention includes any manufacturing method or process of manufacture for forming the trench body, such as by injection molding, casting, or other manner. Further, it is contemplated that a scope of the present invention includes any unitary trench body as formed with flat bottom or with cored standoffs and integral sloped water-channeling surface, regardless of the manufacturing method.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A shower trench drain apparatus comprising:
  a water collecting trench drain body including a block of material formed to include a flat bottom surface and a drain channel with an angled channel bottom surface, the flat bottom surface extending a width and length of the drain channel, and the block including a non-uniformly-thick solid mass of material extending between and forming both the flat bottom surface and the channel bottom surface.

2. The shower trench drain apparatus defined in claim 1, wherein the block has a polygonal configuration and has a top surface shaped to matably receive and matably engage a drain cover.

3. The shower trench drain apparatus defined in claim 1, including a pre-drain strainer shaped to fit into the drain channel.

4. The shower trench drain apparatus defined in claim 1, including a clamp mechanism adapted to mechanically fasten a waterproofing membrane to a top of the drain body.

5. The shower trench drain apparatus defined in claim 1, wherein the body includes standoffs adjustably engaging a grate in a manner that allows for appropriate adjustment to a finished floor height.

6. The shower trench drain apparatus defined in claim 1, wherein the body includes an exit hole that allows for direct coupling of a rough drain pipe stub without the need for additional fittings.

7. The shower trench drain apparatus defined in claim 1, wherein the body bottom structure that is adapted to be mechanically fastened to a flat subfloor of a building structure.

8. The shower trench drain apparatus defined in claim 1, wherein the drain body includes one or more drain exit holes.

9. The shower trench drain apparatus defined in claim 1, wherein the block of material includes a polymeric material.

10. The shower trench drain apparatus defined in claim 9, wherein the polymeric material is one of a PVC and ABS material.

11. A shower trench drain apparatus comprising:
  a water collecting trench drain body including a block of material having a flat bottom extending a width and length to define an enlarged horizontal surface area configured to stably rest on a level horizontal support surface during installation, and an integrally-formed up-facing drain channel with angled bottom surface, the block including non-uniformly-thick material extending between and forming both the flat bottom and the angled bottom surface.

12. The shower trench drain apparatus defined in claim 11, wherein the block of material includes a polymeric material.

13. The shower trench drain apparatus defined in claim 12, wherein the polymeric material is one of a PVC and ABS material.

14. A shower trench drain apparatus comprising:
  a shower trench drain body of polymeric material including a flat bottom surface extending a width and length of the drain channel, and an integrally-formed drain channel with angled bottom surface and at least one drain opening, the body including a non-uniformly-thick solid mass of material extending between and forming both the flat bottom surface and the angled bottom surface;

a waterproof membrane over the drain body;

a clamp ring retaining the membrane to the drain body; and a grate adjustably retained to the drain body by a height adjustment mechanism.

15. The shower trench drain apparatus defined in claim 14, wherein the polymeric material is one of PVS and ABS.

16. A method of constructing a shower trench drain apparatus comprising steps of:

providing a block of polymeric material having a flat bottom surface;

machining the block to form a shower trench drain body of polymeric material including the flat bottom surface, an integrally-formed drain channel with angled bottom surface, and at least one drain opening;

supporting the body by resting the flat bottom surface on a mating level horizontal flat support surface in an installation;

laying a waterproof membrane over the drain body;

clamping the membrane onto the body using a clamp ring; and attaching a grate adjustably to the drain body with an adjusted height that matches a final floor surface of a shower.

17. The method defined in claim 16, wherein the drain body includes a non-uniformly-thick solid mass of material extending between and forming both the flat bottom surface and the angled bottom surface.

\* \* \* \* \*